(12) United States Patent
Sugio et al.

(10) Patent No.: US 10,099,164 B2
(45) Date of Patent: *Oct. 16, 2018

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 15/360,406

(22) Filed: Nov. 23, 2016

(65) Prior Publication Data

US 2017/0072353 A1 Mar. 16, 2017

Related U.S. Application Data

(63) Continuation of application No. 14/410,992, filed as application No. PCT/JP2013/055190 on Feb. 27, 2013, now Pat. No. 9,533,246.

(30) Foreign Application Priority Data

Jul. 2, 2012 (JP) ................................ 2012-148646

(51) Int. Cl.
*B01D 45/08* (2006.01)
*B60T 17/00* (2006.01)
*B01D 53/26* (2006.01)

(52) U.S. Cl.
CPC ........... *B01D 45/08* (2013.01); *B01D 53/261* (2013.01); *B60T 17/004* (2013.01)

(58) Field of Classification Search
CPC ........ B01D 45/02; B01D 45/04; B01D 45/08; B60T 17/002; B60T 17/004
See application file for complete search history.

(56) References Cited

U.S. PATENT DOCUMENTS

| | | |
|---|---|---|
| 1,621,026 A | 3/1927 | Stensen |
| 2,082,863 A | 6/1937 | Weisgerber |

(Continued)

FOREIGN PATENT DOCUMENTS

| | | |
|---|---|---|
| CN | 1248480 A | 3/2000 |
| CN | 1625649 A | 6/2005 |

(Continued)

OTHER PUBLICATIONS

Notification of Reasons for Refusal Japanese Patent Application No. 2013-098864 dated Jun. 20, 2017 with English translation.

(Continued)

*Primary Examiner* — Robert Clemente
(74) *Attorney, Agent, or Firm* — Pillsbury Winthrop Shaw Pittman, LLP

(57) ABSTRACT

An oil separator is provided with a casing having an inlet for air and an outlet for air, an expansion chamber for expanding air introduced therein through the inlet, an accommodation member communicating with the expansion chamber in the vertical direction, a collected liquid storage portion provided below the accommodation member, and a connecting hose having an oil separator connection end for being connected to the inlet and an air dryer connection end for being connected to an air dryer. The connecting hose is configured such that the oil separator connection end is located higher than the air dryer connection end.

2 Claims, 3 Drawing Sheets

(56) References Cited

U.S. PATENT DOCUMENTS

| | | |
|---|---|---|
| 2,756,837 A | 7/1956 | Lovelady |
| 2,776,054 A | 1/1957 | Hirshstein |
| 2,942,691 A | 6/1960 | Dillon |
| 2,966,233 A | 12/1960 | Nelson |
| 3,000,467 A | 9/1961 | Bowers |
| 3,075,336 A | 1/1963 | Hays |
| 3,201,924 A | 8/1965 | Fulford |
| 3,432,991 A | 3/1969 | Sauder |
| 4,136,009 A | 1/1979 | Samiran |
| 4,167,164 A | 9/1979 | Bachmann |
| 4,226,726 A | 10/1980 | Rehm |
| 4,298,465 A | 11/1981 | Druffel |
| 4,534,861 A | 8/1985 | Wedemeyer |
| 4,541,933 A | 9/1985 | Armold |
| 4,627,406 A | 12/1986 | Namiki et al. |
| 4,668,256 A | 5/1987 | Billiet |
| 4,878,923 A | 11/1989 | Muller |
| 4,892,569 A | 1/1990 | Kojima |
| 5,024,203 A | 6/1991 | Hill |
| 5,145,497 A | 9/1992 | Maeda |
| 5,171,130 A | 12/1992 | Kume et al. |
| 5,595,588 A | 1/1997 | Blevins |
| 6,000,383 A | 12/1999 | Diotte et al. |
| 6,058,917 A | 5/2000 | Knowles |
| 6,302,933 B1 | 10/2001 | Krause |
| 6,626,163 B1 | 9/2003 | Busen et al. |
| 7,857,882 B1 | 12/2010 | Johnson |
| 8,540,809 B2 | 9/2013 | Minato |
| 9,017,460 B2 | 4/2015 | Minato |
| 9,533,246 B2* | 1/2017 | Sugio ............... B01D 45/08 |
| 2002/0129586 A1 | 9/2002 | Tanaka |
| 2003/0074870 A1 | 4/2003 | Virgilio |
| 2003/0110949 A1 | 6/2003 | Fornof et al. |
| 2003/0172632 A1 | 9/2003 | Matsubara |
| 2004/0040273 A1 | 3/2004 | Lewin |
| 2004/0238452 A1 | 12/2004 | Moore |
| 2005/0092180 A1 | 5/2005 | Fornof et al. |
| 2005/0188848 A1 | 9/2005 | Salzman et al. |
| 2006/0130654 A1 | 6/2006 | King |
| 2006/0248921 A1 | 11/2006 | Hosford |
| 2006/0254566 A1 | 11/2006 | Yasuhara |
| 2007/0175186 A1 | 8/2007 | Braziunas |
| 2007/0181472 A1 | 8/2007 | Dawes |
| 2007/0215128 A1 | 9/2007 | Yonebayashi et al. |
| 2008/0011550 A1 | 1/2008 | Dunn et al. |
| 2008/0105125 A1 | 5/2008 | Lauson |
| 2009/0056292 A1 | 3/2009 | Fornof et al. |
| 2009/0071188 A1 | 3/2009 | Kusada et al. |
| 2009/0193770 A1 | 8/2009 | Holzmann et al. |
| 2009/0250044 A1 | 10/2009 | Braun et al. |
| 2010/0006075 A1 | 1/2010 | Ruppel et al. |
| 2010/0178236 A1 | 7/2010 | Rameshni |
| 2010/0218682 A1 | 9/2010 | Hammerschick |
| 2010/0229510 A1 | 9/2010 | Heinen et al. |
| 2011/0088641 A1 | 4/2011 | Shudo et al. |
| 2011/0113738 A1 | 5/2011 | Zachos |
| 2011/0179755 A1 | 7/2011 | Gruhler et al. |
| 2011/0308393 A1 | 12/2011 | Minato et al. |
| 2012/0060452 A1 | 3/2012 | Sikkenga |
| 2012/0174537 A1 | 7/2012 | Tornblom |
| 2012/0180442 A1 | 7/2012 | Siber |
| 2012/0186451 A1 | 7/2012 | Duesel |
| 2013/0167719 A1 | 7/2013 | Alper |
| 2014/0345461 A1 | 11/2014 | Sikkenga |
| 2016/0008741 A1 | 1/2016 | Beg |

FOREIGN PATENT DOCUMENTS

| | | |
|---|---|---|
| CN | 1874920 A1 | 12/2006 |
| CN | 201221882 Y | 4/2009 |
| CN | 102317585 A | 1/2012 |
| DE | 742 669 C | 12/1943 |
| DE | 10 2004 016 742 B3 | 9/2005 |
| DE | 10 2006 008 516 A1 | 8/2007 |
| DE | 10 2011 002 582 A1 | 9/2011 |
| EP | 0846485 A1 | 6/1998 |
| GB | 2 033 247 A | 5/1980 |
| JP | S47-29633 Y1 | 8/1972 |
| JP | S52-013336 U | 1/1977 |
| JP | 52-65381 | 5/1977 |
| JP | S52-155279 U | 11/1977 |
| JP | S53-122007 A | 10/1978 |
| JP | 55-126919 | 12/1980 |
| JP | 56-163918 | 12/1981 |
| JP | S57-181913 A | 11/1982 |
| JP | 58-64812 U | 5/1983 |
| JP | S59-109284 A | 6/1984 |
| JP | 60-80615 A | 5/1985 |
| JP | 60-84714 U | 6/1985 |
| JP | S62-71322 U | 5/1987 |
| JP | S62-99313 | 6/1987 |
| JP | 62-179014 U | 11/1987 |
| JP | 63-157234 | 10/1988 |
| JP | 1-84725 | 6/1989 |
| JP | 1-114025 | 8/1989 |
| JP | 1-242119 A | 9/1989 |
| JP | 1-156729 | 10/1989 |
| JP | 2-48125 | 4/1990 |
| JP | 2-106526 | 8/1990 |
| JP | 2-133419 | 11/1990 |
| JP | H2-147212 | 12/1990 |
| JP | 03-030813 A | 2/1991 |
| JP | H03-164584 A | 7/1991 |
| JP | 03-246149 A | 11/1991 |
| JP | H03-115028 U | 11/1991 |
| JP | H04-027780 A | 1/1992 |
| JP | 4-53174 U | 5/1992 |
| JP | 04-59321 U | 5/1992 |
| JP | 04-70970 A | 6/1992 |
| JP | 4-78481 U | 7/1992 |
| JP | 4-110118 U | 9/1992 |
| JP | H05-037628 U | 5/1993 |
| JP | H05-83382 U | 11/1993 |
| JP | H05-296173 A | 11/1993 |
| JP | 06-18572 Y | 5/1994 |
| JP | 06-39782 Y | 10/1994 |
| JP | 06-45781 Y | 11/1994 |
| JP | 06-46496 Y | 11/1994 |
| JP | 06-330720 A | 11/1994 |
| JP | 06-47548 Y | 12/1994 |
| JP | H06-346855 A | 12/1994 |
| JP | 7-4880 U | 1/1995 |
| JP | 07-8020 Y | 3/1995 |
| JP | 7-8020 Y2 | 3/1995 |
| JP | H07-013418 U | 3/1995 |
| JP | H07-197886 A | 8/1995 |
| JP | H07-227514 A | 8/1995 |
| JP | 07-243318 A | 9/1995 |
| JP | 07-46342 Y | 10/1995 |
| JP | 07-269326 A | 10/1995 |
| JP | 7-332810 A | 12/1995 |
| JP | H08-173740 A | 7/1996 |
| JP | H08-233415 A | 9/1996 |
| JP | 08-290027 A | 11/1996 |
| JP | H08-290027 A | 11/1996 |
| JP | 09-177532 A | 7/1997 |
| JP | 10-176667 A | 6/1998 |
| JP | 10-211407 A | 8/1998 |
| JP | 10-296038 A | 11/1998 |
| JP | H10-323529 A | 12/1998 |
| JP | H11-108474 A | 4/1999 |
| JP | 11-510757 A | 9/1999 |
| JP | 2000-045749 A | 2/2000 |
| JP | 2000-282839 A | 10/2000 |
| JP | 2002-097919 A | 4/2002 |
| JP | 2002-544421 A | 12/2002 |
| JP | 2003-531330 A | 10/2003 |
| JP | 2003-322084 A | 11/2003 |
| JP | 2004-232625 A | 8/2004 |
| JP | 2005-066470 A | 3/2005 |
| JP | 2006-075814 A | 3/2006 |
| JP | 2006-316641 A | 11/2006 |
| JP | 2007-016664 A | 1/2007 |
| JP | 2007-162248 A | 6/2007 |

(56) References Cited

FOREIGN PATENT DOCUMENTS

| | | |
|---|---|---|
| JP | 2007-247623 A | 9/2007 |
| JP | 2007-255397 A | 10/2007 |
| JP | 2008-002377 A | 1/2008 |
| JP | 2008-019857 A | 1/2008 |
| JP | 2008-202894 A | 9/2008 |
| JP | 2009-008096 A | 1/2009 |
| JP | 2009-109102 A | 5/2009 |
| JP | 2010-017823 A | 1/2010 |
| JP | 2010-501788 A | 1/2010 |
| JP | 2010-270743 A | 12/2010 |
| JP | 2011-025205 A | 2/2011 |
| JP | 2011-027331 A | 2/2011 |
| JP | 2011-085118 A | 4/2011 |
| JP | 2011-157927 A | 8/2011 |
| JP | 2012-130917 A | 7/2012 |
| WO | WO 88/02658 A1 | 4/1988 |
| WO | WO 01/52973 A1 | 7/2001 |
| WO | WO 01/79664 A1 | 10/2001 |
| WO | WO 2007/036560 A1 | 4/2007 |

OTHER PUBLICATIONS

Notification of Reasons for Refusal Japanese Patent Application No. 2016-138863 dated Jul. 4, 2017 with English translation.
Notification of Reasons for Refusal Japanese Patent Application No. 2017-026067 dated Nov. 7, 2017 with English translation.
Notification of Reasons for Refusal as issued in Japanese Application No. 2013-036394, dated Oct. 11, 2016.
Notification of Reasons for Refusal as issued in Japanese Application No. 2012-241234, dated Oct. 18, 2016.
Notification of Reasons for Refusal as issued in Japanese Application No. 2012-147748, dated Oct. 4, 2016.
Non-Final Office Action as issued in U.S. Appl. No. 14/380,847, dated Sep. 27, 2016.
Non-Final Office Action as issued in U.S. Appl. No. 14/399,485, dated Aug. 1, 2016.
Extended European Search Report as issued in European Patent Application No. 13813863.1, dated Jul. 5, 2016.
Extended European Search Report as issued in European Patent Application No. 13788303.9, dated Aug. 16, 2016.
Non-Final Office Action as issued in U.S. Appl. No. 14/380,810, dated May 25, 2016.
Extended European Search Report as issued in European Patent Application No. 13754685.9, dated Jun. 24, 2016.
Notification of Reasons for Refusal as issued in Japanese Patent Application No. 2012-106869, dated Apr. 26, 2016.
Office Action as issued in Chinese Patent Application No. 201380033626.6, dated Mar. 28, 2016.
Office Action as issued in Chinese Patent Application No. 201380020964.6, dated Mar. 24, 2016.
Notification of Reasons for Refusal as issued in Japanese Patent Application No. 2012-147748, dated Feb. 2, 2016.
Partial European Search Report as issued in European Patent Application No. 13754685.9, dated Feb. 4, 2016.
Extended European Search Report as issued in European Patent Application No. 13755157.8, dated Dec. 23, 2015.
Notification of Reasons for Refusal as issued in Japanese Patent Application No. 2012-040583, dated Dec. 8, 2015.
Extended European Search Report as issued in European Patent Application No. 13755024.0, dated Dec. 22, 2015.
Non-Final Office Action as issued in U.S. Appl. No. 14/380,830, dated Dec. 24, 2015.
Notification of Reasons for Refusal as issued in Japanese Patent Application No. 2012-040584, dated Nov. 24, 2015.
First Office Action as issued in Chinese Patent Application No. 201380010722.9, dated Nov. 3, 2015.
Notification of Reasons for Refusal as issued in Japanese Patent Application No. 2012-040580, dated Sep. 1, 2015.
International Preliminary Report on Patentability as issued in International Application No. PCT/JP2013/055190, dated Jan. 6, 2015.
International Search Report issued in International Patent Application No. PCT/JP2013/055190, dated Jun. 18, 2013.
Final Office Action issued in corresponding U.S. Appl. No. 14/380,847 dated Dec. 21, 2017.
Office Action Chinese Patent Application No. 201610031843.7 dated May 27, 2017.
Notification of Reasons for Refusal Japanese Patent Application No. 2013-098863 dated Jun. 13, 2017 with English translation.
Non-Final Office Action as issued in U.S. Appl. No. 14/399,485, dated Jun. 6, 2017.
Notification of Reasons for Refusal as issued in Japanese Patent Application No. 2016-138862, dated Apr. 25, 2017.
Notification of Reasons for Refusal Japanese Patent Application No. 2017-026067 dated Jun. 5, 2018 with English translation.

* cited by examiner

OIL SEPARATOR

CROSS-REFERENCE TO RELATED APPLICATIONS

This application is a continuation of U.S. patent application Ser. No. 14/410,992, filed on Dec. 23, 2014, which is the U.S. National Stage of PCT/JP2013/055190, filed Feb. 27, 2013, which claims priority to Japanese Patent Application No. 2012-148646, filed Jul. 2, 2012. The contents of all of these applications are incorporated herein by reference in their entireties.

FIELD OF THE INVENTION

The present invention relates to an oil separator that separates oil contained in air that has passed through equipment.

BACKGROUND OF THE INVENTION

Vehicles such as trucks, buses, and construction machines utilize compressed air delivered by a compressor, which is directly connected to the engine, to control systems such as brakes and suspensions. The compressed air contains water, which is contained in the atmosphere, and oil for lubricating the inside of the compressor. When the compressed air containing such water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water adsorbed by the desiccant and discharging it to the outside.

The air discharged from the air dryer during regeneration of the desiccant contains oil together with water. Considering the burden on the environment, an oil separator may be provided downstream of the compressor in the air system.

Some oil separators perform gas/liquid separation by allowing air that contains water and oil to strike impingement members provided in the housing to recover the oil from the air and discharge cleaned air (for example, Patent Document 2).

PRIOR ART DOCUMENTS

Patent Documents

Patent Document 1: Japanese Laid-Open Patent Publication No. 10-296038
Patent Document 2: Japanese Laid-Open Patent Publication No. 2008-2377

SUMMARY OF THE INVENTION

Installation of an oil separator in an air dryer requires a space for installing the air dryer and the oil separator. Particularly, the vertical height of such an installation space has been desired to be reduced.

Accordingly, it is an objective of the present invention to provide an oil separator that reduces the vertical height of installation space for an air dryer and an oil separator.

To achieve the foregoing objective and in accordance with one aspect of the present invention, an oil separator is provided that includes a housing including an inlet for air and an outlet for air, an expansion chamber, which is located in the housing and expands air that has been introduced through the inlet, an accommodation member, which is located in the housing and communicates with the expansion chamber in the vertical direction, and a collected liquid storage portion. The accommodation member accommodates an impingement member. The collected liquid storage portion is located below the accommodation member. The oil separator introduces air containing oil from an air dryer into the housing through the inlet and causes the air to strike the impingement member to separate oil from the introduced air, thereby recovering the oil. The inlet and the outlet are located in an upper section of the housing. The oil separator further includes a connecting hose having an oil separator connection end for being connected to the inlet and an air dryer connection end for being connected to a purge air outlet, which discharges purge air from the air dryer. The connecting hose is configured such that when the connecting hose connects the inlet to the purge air outlet, the oil separator connection end is located at a position higher than the air dryer connection end in the vertical direction.

DETAILED DESCRIPTION OF THE PREFERRED EMBODIMENTS

An oil separator according to the present invention will now be described with reference to FIGS. 1 to 5. The oil separator is applied to an exhaust system of an air dryer.

Figure 1:
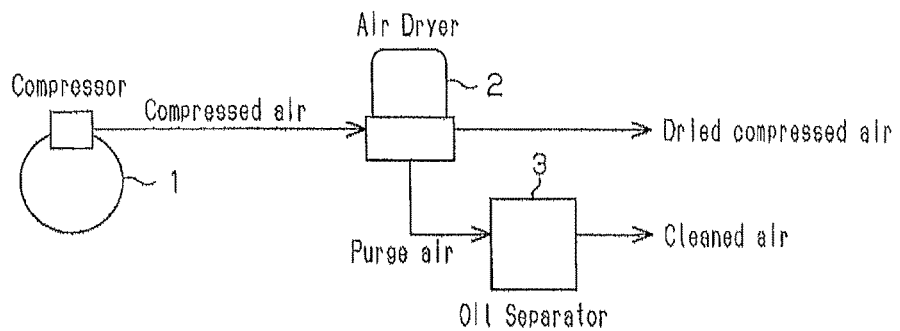
FIG. 1 is a block diagram illustrating an installation position of an oil separator in an air system according to one embodiment of the present invention.

As shown in FIG. 1, vehicles such as trucks, buses, and construction machines utilize compressed air delivered by a compressor 1 to control systems such as brakes and suspensions. Thus, an air dryer 2, which removes oil and water in the compressed air and provides dried air, is located downstream of the compressor 1 of an air system. The air dryer 2 contains desiccant. The air dryer 2 performs dehumidification to remove oil and water from the compressed air and regeneration to regenerate the desiccant by removing the oil and water adsorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and water from purge air discharged during regeneration of the desiccant in the air dryer 2.

The oil separator 3 is an impingement plate-type oil separator and includes, inside the housing, impingement members, against which air containing oil and water strikes. The impingement plate-type oil separator 3 performs gas/liquid separation by allowing air containing oil and water to strike the impingement members. In this manner, the oil separator 3 recovers oil from air, and discharges cleaned air. The separated oil and water will hereafter be referred to as collected liquid in some cases.

Figure 2:
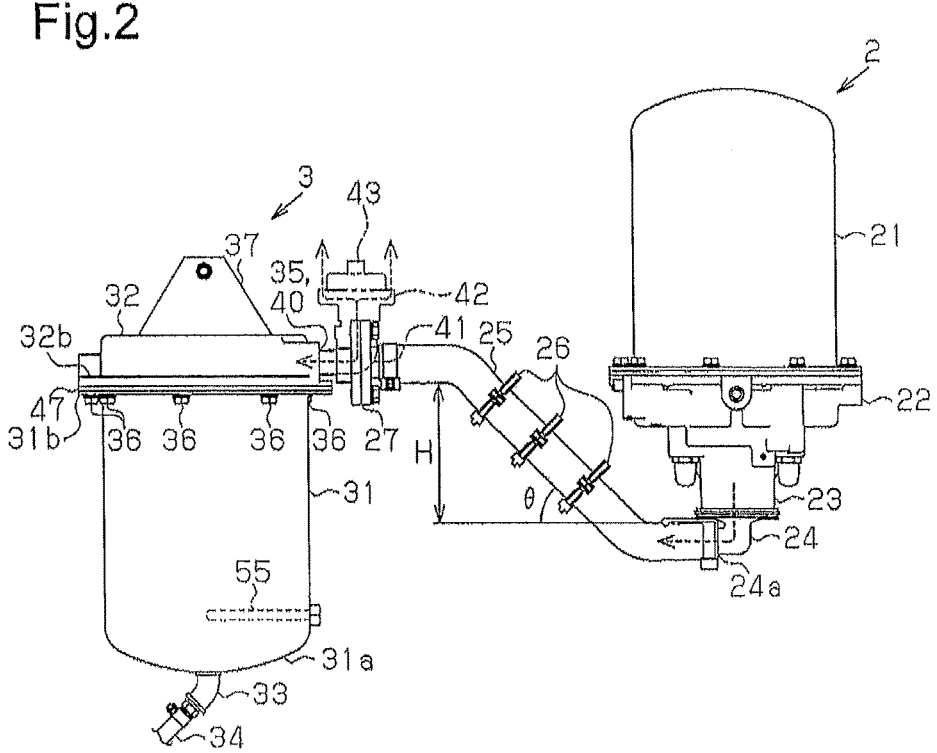
FIG. 2 is a diagram illustrating a connection state of the oil separator and the air dryer of FIG. 1.

As shown in FIG. 2, an air dryer 2 includes a cylindrical case 21 having a vertically upper end closed, and a support member 22, which closes the opening portion of the case 21 and supports the case 21. A purge air outlet 23, which discharges purge air during regeneration of a desiccant, is formed at the lower section of the support member 22. A purge air discharge cover 24 is attached to the purge air outlet 23. An air dryer connection end of the connecting hose 25 is connected to the purge air outlet 23 via the purge air discharge cover 24. An oil separator connection end of the connecting hose 25 is connected to the oil separator 3. The connecting hose 25 is secured to, for example, the chassis of a vehicle with clips 26. An inlet (not shown) for introducing air compressed by the compressor 1 and an outlet (not shown) for discharging dried compressed air are formed in the support member 22 of the air dryer 2.

The oil separator 3 includes a cylindrical case 31 having a closed end and extending in the vertical direction and a lid 32, which closes the opening portion of the case 31. The case 31 and the lid 32 form a housing. A drain outlet 33 for draining the collected liquid that has been stored is provided at a bottom portion 31a of the case 31. A drain hose 34, which is used when removing the collected liquid, is connected to the drain outlet 33. The lid 32 has an inlet 35 for introducing the purge air from the air dryer 2 through the connecting hose 25, and an outlet 40 for discharging cleaned air from which oil has been separated. The inlet 35 and the outlet 40 are formed separately. The oil separator connection end of the connecting hose 25 is connected to the inlet 35 via an coupling member 27. The connecting hose 25 connects the inlet 35 to a connection port 24a of the purge air discharge cover 24. The angle between the inlet 35 and the connection port 24a of the purge air discharge cover 24, that is, the angle θ of the axis along which the connecting hose 25 extends with respect to the horizontal plane is 40 degrees. The height difference H between the inlet 35 and the connection port 24a of the purge air discharge cover 24 is 700 mm. This maintains discharge of purge air to the oil separator 3 from the air dryer 2.

The inlet 35 of the oil separator 3 is located above the connection port of the purge air discharge cover 24 in the vertical direction. Thus, the overall height of the installation space, which includes the air dryer 2 and the oil separator 3, is reduced in the vertical direction.

An elbow member 41, which extends in the horizontal direction and bends vertically upward, is connected to the outlet 40 of the oil separator 3. A drip preventing member 42 and a cover 43 for preventing entry of foreign matter are attached on the distal end of the elbow member 41.

Figure 3:
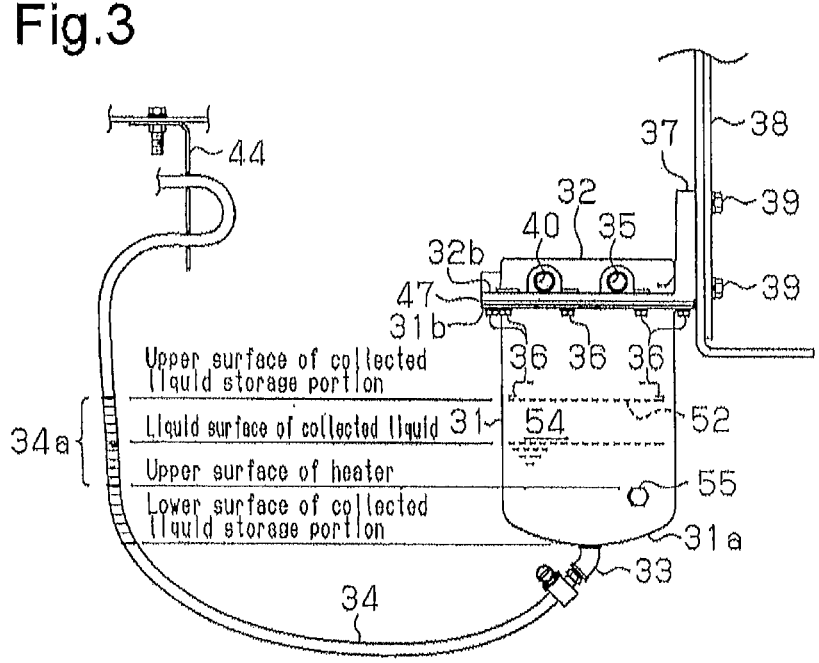
FIG. 3 is a diagram illustrating a mounted state of the oil separator of FIG. 1.

As shown in FIG. 3, a mounting member 37 is formed integrally with the lid 32 of the oil separator 3 to extend upright from the lid 32. The mounting member 37 is secured to a chassis 38 with bolts 39.

Also, the distal end of the drain hose 34 is hooked to a support plate 44, which is secured to, for example, the chassis of a vehicle. The distal end of the drain hose 34 is located above the lid 32 of the oil separator 3.

Figure 4:
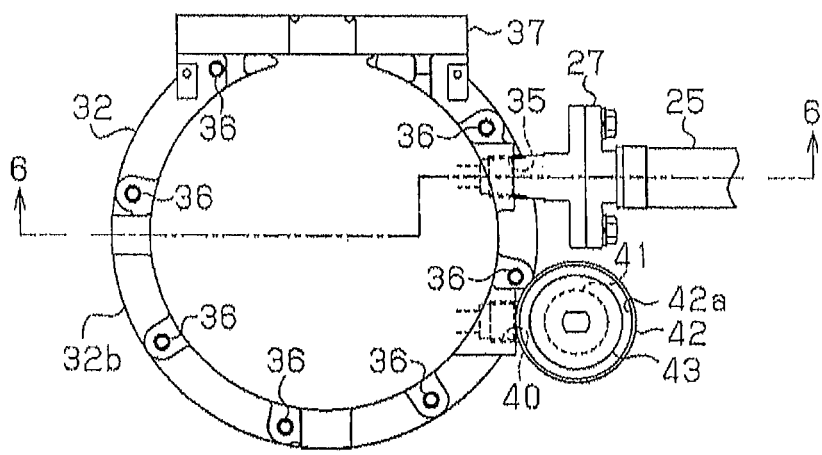
FIG. 4 is a top view illustrating the position of an inlet and an outlet of the oil separator of FIG. 1.

As shown in FIG. 4, the lid 32 has the inlet 35 and the outlet 40, which are open in the same direction. The connecting hose 25 is connected to the inlet 35 via the coupling member 27. The elbow member 41 is connected to the outlet 40. That is, the coupling member 27 and the elbow member 41 are arranged next to each other in the horizontal direction.

Figure 5:
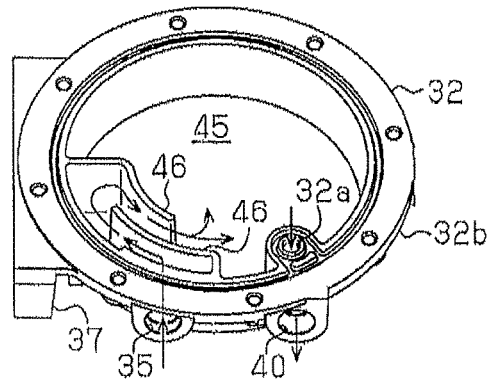
FIG. 5 is a bottom perspective view illustrating the inside of the lid of the oil separator of FIG. 1.

As shown in FIG. 5, the lid 32 is a cylinder having a vertically upper end closed. Two baffle plates 46 extend from the inner wall of the lid 32 in the vicinity of the inlet 35 to be perpendicular to the flow direction of the purge air introduced through the inlet 35. The internal space of the lid 32 functions as a first expansion chamber 45, which expands the purge air introduced from the inlet 35. The lid 32 has a communication section 32a, which connects the inside of the case 31 to the outlet 40.

Figure 6:
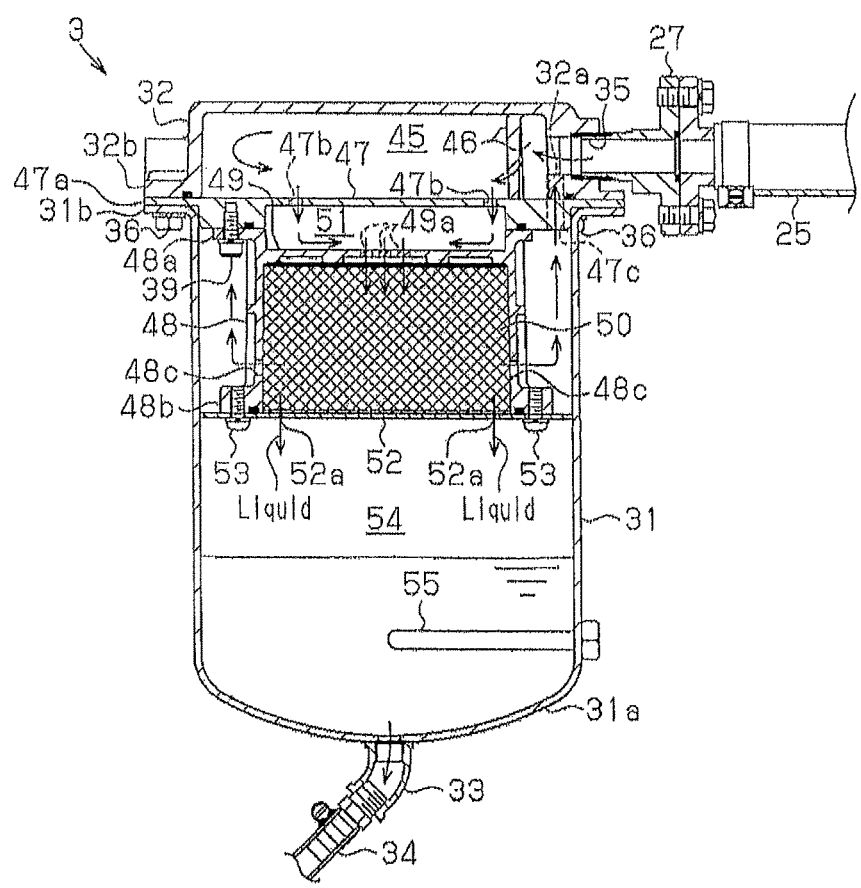
FIG. 6 is a cross-sectional view taken along line 6-6 in FIG. 4.

As shown in FIG. 6, a disk-like cover 47, which closes the case 31 and the opening portion of the lid 32, is provided between the case 31 and the lid 32. The cover 47 and the case 31 are fastened to the lid 32 with bolts 36. That is, the bolts 36 are fastened to threaded bores formed in a flange portion 32b provided on the lid 32. Furthermore, threaded portions of the bolts 36 extend through through-holes formed in a flange portion 31b provided on the case 31. The cover 47 has through-holes through which the threaded portions of the bolts 36 extend. Thus, the threaded portions of the bolts 36 extend through the through-holes of the flange portion 31b of the case 31 and the through-holes of a flange portion 47a of the cover 47. The bolts 36 are then screwed to the threaded bores of the flange portion 32b of the lid 32 so that the lid 32, the cover 47, and the case 31 are fastened together. The cover 47 has a communication hole 47c, which connects the inside of the case 31 to the outlet 40.

The lid 32 and the cover 47 form a space that functions as the first expansion chamber 45. A cylindrical accommodation member 48 with a vertically upper end closed is secured to the cover 47 with bolts 36. The accommodation member 48 accommodates a urethane foam block 50 such as a sponge block. The urethane foam block 50 functions as an impingement member. A flange portion 48a and a flange portion 48b are formed at an upper edge and a lower edge of the accommodation member 48, respectively. The bolts 36 extend through the flange portion 48a formed at the upper edge of the accommodation member 48 so that the accommodation member 48 is tightened to the cover 47. The cover 47 and the upper surface of the accommodation member 48 form a space that functions as a second expansion chamber 51. The cover 47 has through holes 47b, which connect the first expansion chamber 45 to the second expansion chamber 51. Through holes 49a are formed at the center portion of an upper base 49 of the accommodation member 48. The through holes 47b of the cover 47 and the through holes 49a of the upper base 49 of the accommodation member 48 are formed at positions that are not opposed to each another. The accommodation member 48 has through holes 48c formed at the lower end of the side face at intervals in the radial direction.

A disk-like support lid 52 is secured with screws 53 to the flange portion 48b, which is formed at the lower edge of the accommodation member 48. The disk-like support lid 52 supports the urethane foam block 50 accommodated in the accommodation member 48. The inner diameter of the support lid 52 is substantially the same as the inner diameter of the case 31. The support lid 52 has through holes 52a, which permit the oil and water removed by the urethane foam block 50 to drop. Thus, the lower section in the case 31 functions as a collected liquid storage portion 54. A heater 55 for evaporating water in the collected liquid by heating the stored collected liquid is arranged in the collected liquid storage portion 54. Heating of the heater 55 is controlled by a non-illustrated thermostat.

The drain hose 34 is transparent, and has a scale 34a corresponding to the volume of the collected liquid storage portion 54. For example, the scale 34a is provided corresponding to the upper surface of the collected liquid storage portion 54, the upper surface of the heater 55, and the lower surface of the collected liquid storage portion 54. The amount of the collected liquid in the collected liquid storage portion 54 is easily determined by visually checking the amount of the collected liquid in the drain hose 34.

Operation of the above-described oil separator will now be described.

As shown in FIG. 2, the purge air discharged from the air dryer 2 is introduced to the oil separator 3. The purge air contains oil and water.

As shown in FIG. 5, the purge air introduced through the inlet 35 strikes the baffle plates 46, is introduced into the oil separator 3 along the baffle plates 46, and expands in the first expansion chamber 45.

As shown in FIG. 6, the air expanded in the first expansion chamber 45 enters the second expansion chamber 51 via the through holes 47b formed in the cover 47. The air that has expanded in the second expansion chamber 51 enters the accommodation member 48 via the through holes 49a of the upper base 49 of the accommodation member 48. At this time, the oil and water that has struck the urethane foam block 50 is separated from the air. The liquid that contains the water and the oil trapped by the urethane foam block 50 moves through the urethane foam block 50. The liquid reaches the upper surface of the support lid 52, drops from the through holes 52a of the support lid 52 into a collected liquid storage portion 54, and is stored in the collected liquid storage portion 54. The collected liquid that has stored in the collected liquid storage portion 54 enters the drain hose 34 through the drain outlet 33. The collected liquid stored in the collected liquid storage portion 54 is heated by the heater 55. This evaporates the water in the collected liquid. Furthermore, the amount of the collected liquid stored in the collected liquid storage portion 54 can be grasped by checking the amount of the collected liquid stored in the drain hose 34. When the amount of the collected liquid approaches the upper limit, the collected liquid is drained from the collected liquid storage portion 54 through the drain hose 34.

On the other hand, oil and water are separated from the air that has entered the accommodation member 48 from the through holes 49a of the upper base 49 of the accommodation member 48. The air then enters the case 31 from the through holes 48c on the side face of the accommodation member 48. The air that has entered the case 31 passes through the communication hole 47c of the cover 47 and the communication section 32a of the lid 32, and is discharged through the outlet 40. Thus, the air that has entered the case 31 hardly contacts the collected liquid in the collected liquid storage portion 54, and is discharged from the outlet 40. The air that is discharged from the outlet 40 is cleaned air that does not contain oil.

The above-described embodiment achieves the following advantages.

(1) When the connecting hose 25 connects the inlet 35 to the connection port 24a of the purge air discharge cover 24, the inlet 35 is located at a higher position than the connection port 24a of the purge air discharge cover 24 in the vertical direction. That is, the inlet 35 of the oil separator 3 is located above the connection port 24a of the purge air discharge cover 24 in the vertical direction. This reduces the heights of the air dryer 2 and the oil separator 3, that is, the height of the installation space of the air dryer 2 and the oil separator 3 in the vertical direction.

(2) When the connecting hose 25 connects the inlet 35 to the connection port 24a of the purge air discharge cover 24, the angle between the inlet 35 and the connection port 24a of the purge air discharge cover 24, that is, the angle θ of the axis along which the connecting hose 25 extends with respect to the horizontal plane is less than or equal to 40 degrees, and the height difference H between the inlet 35 and the connection port 24a of the purge air discharge cover 24 is less than or equal to 700 mm. This reduces the heights in the vertical direction of the air dryer 2 and the oil separator 3, while maintaining discharge of purge air to the oil separator 3 from the air dryer 2.

The above described embodiment may be modified as follows. In the above illustrated embodiment, when the connecting hose 25 connects the inlet 35 to the connection port 24a of the purge air discharge cover 24, the angle θ between the inlet 35 and the connection port 24a of the purge air discharge cover 24 may be greater than 40 degrees and less than or equal to 45 degrees, and the height difference H between the inlet 35 and the connection port 24a of the purge air discharge cover 24 may be greater than 700 mm and less than or equal to 1000 mm.

In the above illustrated embodiment, the scale 34a is provided on the drain hose 34, but the scale 34a may be omitted from the drain hose 34.

In the above illustrated embodiment, the drain hose 34 is connected to the drain outlet 33 of the case 31. However, the drain hose 34 may be omitted, and a plug may be provided on the drain outlet 33 so that the collected liquid can be directly discharged from the drain outlet 33.

In the above illustrated embodiment, the first expansion chamber 45 and the second expansion chamber 51 are provided in the oil separator 3. However, at least one of the first expansion chamber 45 and the second expansion chamber 51 may be provided.

In the above illustrated embodiment, a member such as a nonwoven fabric filter may be provided upstream or downstream of the urethane foam block 50 or in the expansion chambers 45, 46. In this case, the removal rate of the oil component is increased. Furthermore, the urethane foam block 50 such as a sponge block or a member such as a nonwoven fabric filter may be charged with static electricity. The members can be charged with static electricity by a method such as utilizing the flow of dried air from the dryer. Also, the urethane foam block 50 such as a sponge block and the member such as a nonwoven fabric filter may be formed of material that is electrically charged from the beginning. In this case, the removal rate of the oil component is further increased.

In above illustrated third embodiment, the urethane foam block 50 is employed as the impingement member, but other members such as a crushed aluminum member may be employed. Furthermore, instead of an expansion chamber having an impingement member, a simple expansion chamber without any impingement member may be employed.

In the above illustrated embodiment, the number of heater 55 may be changed as required.

The invention claimed is:
1. A system comprising:
an air dryer having a purge air outlet for discharging purge air from the air dryer and;
an oil separator connected to the air dryer, wherein the oil separator comprises a housing including an inlet for purge air and an outlet for purge air, the oil separator is configured to introduce purge air containing oil from the air dryer into the housing through the inlet to separate oil from the introduced purge air, thereby recovering the oil, the oil separator further includes a connecting hose having an oil separator connection end that is connected to the inlet of the oil separator and an air dryer connection end that is connected to the purge air outlet of the air dryer, and the oil separator connection end is located at a position higher, in the vertical direction, than the air dryer connection end.

2. A system comprising:

an air dryer having a purge air outlet for discharging purge air from the air dryer and;

an oil separator connected to the air dryer, wherein the oil separator comprises a housing including an inlet for purge air and an outlet for purge air, the oil separator is configured to introduce purge air containing oil from the air dryer into the housing through the inlet to separate oil from the introduced purge air, thereby recovering the oil, and the inlet of the oil separator is located at a position higher, in the vertical direction, than the purge air outlet of the air dryer.

* * * * *